Figure 1:
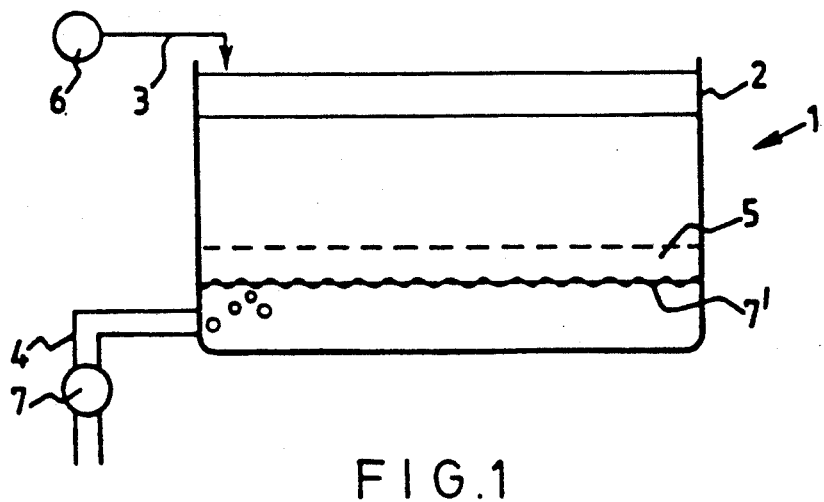

United States Patent [19]

Smith et al.

[11] Patent Number: 5,151,197
[45] Date of Patent: Sep. 29, 1992

[54] FLUID TREATMENT

[75] Inventors: Alan J. Smith, Hemel Hempstead; Jennifer J. Quinn, London, both of England

[73] Assignee: Thames Water Utilities Limited, United Kingdom

[21] Appl. No.: 576,526
[22] PCT Filed: Feb. 13, 1990
[86] PCT No.: PCT/GB90/00235
  § 371 Date: Dec. 7, 1990
  § 102(e) Date: Dec. 7, 1990
[87] PCT Pub. No.: WO90/09353
  PCT Pub. Date: Aug. 23, 1990

[30] Foreign Application Priority Data

Feb. 14, 1989 [GB] United Kingdom ............... 8903292

[51] Int. Cl.⁵ .............................................. C02F 1/72
[52] U.S. Cl. .................................. 210/758; 210/760; 210/139; 210/220; 210/258; 210/274
[58] Field of Search ............... 210/199, 201, 220, 258, 210/758, 760, 138, 139, 274

[56] References Cited

U.S. PATENT DOCUMENTS

| 3,654,149 | 4/1972 | Hedgpeth | 210/758 X |
| 3,867,290 | 2/1975 | Mackey | 210/199 X |
| 3,925,208 | 12/1975 | Yost | 210/199 |
| 4,007,118 | 2/1977 | Ciambrone | 210/760 |
| 4,278,546 | 7/1981 | Roesler | 210/199 X |
| 4,325,823 | 4/1982 | Graham | 210/199 X |
| 4,627,923 | 12/1986 | Ross | 210/758 X |

Primary Examiner—Charles Hart
Attorney, Agent, or Firm—Shapiro and Shapiro

[57] ABSTRACT

Apparatus (1) for treating fluid, in this case wastewater, comprising a treatment vessel or tank (2), means (3) to supply wastewater to be treated in a pulsed sequence to the vessel, and means (4) to supply treatment fluid, in this case comprising oxygen to the vessel or tank (2) in a pulsed sequence opposite to the pulsed sequence of the supply of wastewater to be treated.

11 Claims, 1 Drawing Sheet

FLUID TREATMENT

The invention relates to fluid treatment, particularly treatment of wastewater, typically the removal of contamination-typically suspended solids, ammoniacal nitrogen and biochemical oxygen demand from a wastewater.

Traditionally wastewater treatment is accomplished by biological oxidation, using air, of organic material and nitrogenous matter by bacteria and microorganisms suspended in a fluid or attached to an inert support media.

Where the bacteria and microorganisms are attached to inert media particles comprising a bed or filter, with a constant stream of wastewater flowing down through the bed, upward passage of air will expand the media and allow suspended solids through the bed and out in the effluent. This contamination will require further treatment before discharge to a watercouse, which is a time-consuming and expensive operation.

It is accordingly an object of the invention to seek to mitigate this disadvantage.

According to a first aspect of the invention there is provided an apparatus for treating fluid, comprising a treatment vessel, means to supply fluid to be treated in a pulsed sequence to the vessel, and means to supply treatment fluid to the vessel in a pulsed sequence which is opposite to the pulsed sequence of the supply of fluid to be treated.

The vessel may include an inert media for supporting organic and/or inorganic treatment material. This provides for a relatively simple treatment apparatus.

The media may comprise a bed of granules.

The media may alternatively comprise layers of different granules.

The granules may comprise natural minerals, or treated natural or artificial materials.

The vessel may comprise internal baffles defining a sinuous path for the fluid to be treated in the vessel.

According to a second aspect of the invention there is provided a method of treating a fluid comprising the steps of providing a treatment vessel, supplying fluid to the vessel in a pulsed sequence and supplying treatment fluid to the vessel in a pulsed sequence which is opposite the pulsed sequence of the supply of fluid to be treated.

The method may include the step of providing a supply of treatment media in the vessel.

The fluid to be treated and the treatment fluid being supplied to the vessel may be in a counter current flow. This provides for effective mixing and treatment of the fluid.

The fluid to be treated may follow a sinuous path through the vessel.

The fluid to be treated may be wastewater and the treatment fluid may be a gas such as oxygen, the volume of which in each pulse may be proportional to the effective oxygen requirement of the vessel during a preceding pulse of wastewater.

Apparatus and method embodying the invention are hereinafter described, by way of example, with reference to the accompanying drawings.

Figure 2:
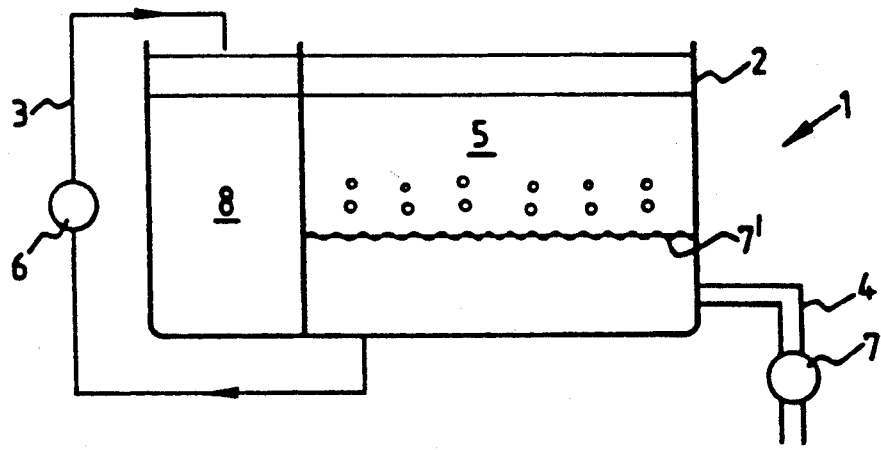
Figure 3:
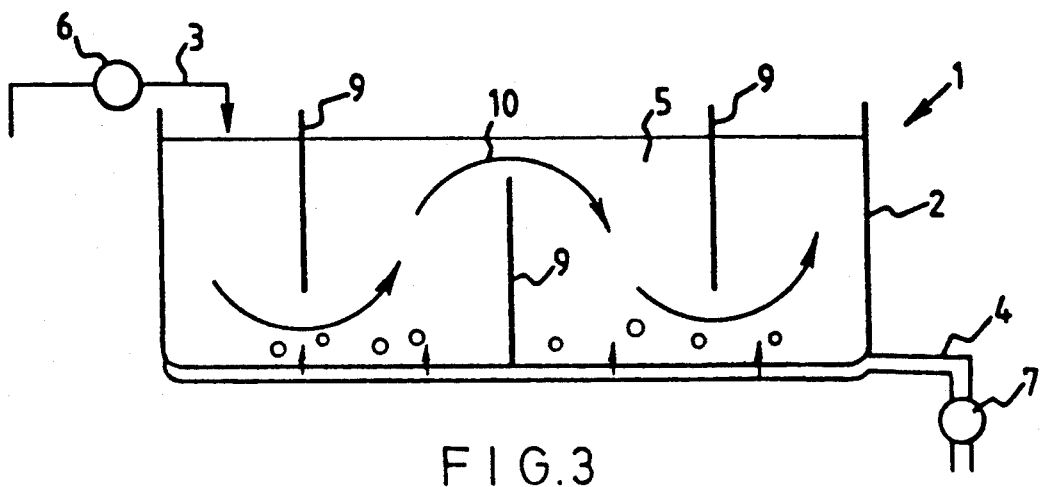

FIGS. 1, 2 and 3 show respectively schematic side elevations of first, second and third embodiments of apparatus for treating wastewater.

Referring to the drawings, in which like parts are referred to be like numerals, there is provided apparatus 1 for treating fluid, in this case wastewater, comprising a treatment vessel or tank 2, means 3 to supply wastewater to be treated in a pulsed sequence to the vessel, and means 4 to supply treatment fluid, in this case comprising oxygen, to the vessel or tank 2 in a pulsed sequence opposite to the pulsed sequence of the supply of wastewater to be treated.

The vessel or tank 2 includes a bed of treatment media comprising a single uniform bed 5 of a suitable form such as granules of natural minerals, or treated natural or artificial materials for supporting organic and/or inorganic treatment material.

The treatment gas comprising oxygen is in the form of air, pure oxygen, oxygen enhanced air or ozonated air and is introduced into the base of the bed through an inlet by the treatment fluid supply means 4. The supply means 3 for the wastewater includes a timer 6 and the supply means 4 for the gas comprises a timer 7, there being a mechanism to ensure that the time of each pulse is the same for the wastewater and gas, but opposite. In other words, when the wastewater is flowing in, the gas is stopped from flowing and vice versa. In this way the granules of the bed 5 are always quiescent when the wastewater flows into it, so that there is no separation of the granules before treatment of the wastewater so no suspended solids will be "flushed" out by gas before treatment in the bed has taken place. The volume of gas, say air, introduced is proportional to the effective oxygen requirement of the wastewater introduced into the bed during the preceding pulse of wastewater flow.

FIG. 1 shows an embodiment where there is an aeration grid 7' at the bottom, as viewed.

FIG. 2 shows an embodiment in which there is a secondary wastewater (sewage) treatment stage 8 in the vessel 2 after treatment with gas in the bed 5 by counter current flow.

FIG. 3 shows an embodiment where the vessel includes baffles 9 arranged to provide a sinuous path 10 for the wastewater through the bed 5, the gas entering from below as shown. The baffles 9 prevent short-circuiting. It is also possible to match aeration to B.O.D. so that as B.O.D. "tapers" across the vessel 2, the granule grain size can be varied to accommodate the change.

Using the apparatus and method described, it is possible to provide aerated and unaerated sewage treatment steps in a single reaction vessel 2, and to provide a washing step for the bed 5.

The invention also provides a batch reactor for sewage.

We claim:

1. Apparatus for treating fluid, comprising:
   (a) a treatment vessel;
   (b) a bed of inert separable treatment material in said vessel;
   (c) first supply means for supplying a fluid to be treated to said bed;
   (d) second supply means for supplying a treatment fluid to said bed; and
   (e) control means for causing said first supply means to supply said fluid to be treated to said bed in a first pulsed sequence and for causing said second supply means to supply said treatment fluid to said bed in a second pulsed sequence of substantially equal pulse duration to said first pulsed sequence, but opposite to said first pulsed sequence, such that said bed is substantially quiescent with no substantial separation of said material thereof when said fluid to be treated flows into said bed.

2. Apparatus according to claim 1, wherein said treatment material is granular.

3. Apparatus according to claim 2, wherein said treatment material is arranged in layers of different granules.

4. Apparatus according to claim 2, wherein said treatment material comprises natural-mineral granules.

5. Apparatus according to claim 2, wherein said treatment material comprises at least one of treated granules of natural material and treated granules of artificial material.

6. Apparatus according to claim 1, wherein said vessel comprises internal baffles defining a sinuous flow path through said bed for said fluid to be treated.

7. A method of treating fluid, comprising:
 (a) providing a treatment vessel containing a bed of inert separable treatment material;
 (b) a first supplying step of supplying a fluid to be treated to said bed;
 (c) a second supplying step of supplying a treatment fluid to said bed; and
 (d) controlling the first and second supplying steps to cause said fluid to be treated to be supplied to said bed in a first pulsed sequence and to cause said treatment fluid to be supplied to said bed in a second pulsed sequence of substantially equal pulse duration to said first pulsed sequence, but opposite to said first pulsed sequence, such that said bed is substantially quiescent with no substantial separation of said material thereof when said fluid to be treated flows into said bed.

8. A method according to claim 7, wherein said fluid to be treated and said treatment fluid are supplied to said bed in counter current fashion.

9. A method according to claim 7, wherein said fluid to be treated is directed to flow in a sinuous path through said bed.

10. A method according to claim 7, wherein said fluid to be treated is wastewater and said treatment fluid is gaseous.

11. A method according to claim 10, wherein said treatment fluid comprises oxygen, the volume of which in each pulse of said second pulsed sequence is proportional to the effective oxygen requirement of a preceding wastewater pulse of said first pulsed sequence.

* * * * *